(12) United States Patent
Yoshida et al.

(10) Patent No.: US 7,775,338 B2
(45) Date of Patent: Aug. 17, 2010

(54) CONTROL DEVICE AND CONTROL METHOD FOR VEHICLE

(75) Inventors: Yoshiyuki Yoshida, Hitachi (JP); Tetsuo Matsumura, Hitachinaka (JP); Kentaro Shishido, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 479 days.

(21) Appl. No.: 11/657,082

(22) Filed: Jan. 24, 2007

(65) Prior Publication Data

US 2007/0175720 A1  Aug. 2, 2007

(30) Foreign Application Priority Data

Jan. 27, 2006  (JP) .............................. 2006-018359

(51) Int. Cl.
  *F16D 48/02*  (2006.01)
  *F16D 13/74*  (2006.01)
(52) U.S. Cl. ..................... 192/113.3; 74/467; 184/6.12; 192/30 W
(58) Field of Classification Search .............. 192/113.3, 192/113.35
See application file for complete search history.

(56) References Cited

U.S. PATENT DOCUMENTS

2004/0112171 A1* 6/2004 Kuhstrebe et al. .......... 74/730.1

FOREIGN PATENT DOCUMENTS

JP  2006-065199  3/2000

* cited by examiner

*Primary Examiner*—Rodney H Bonck
(74) *Attorney, Agent, or Firm*—Crowell & Moring LLP

(57) ABSTRACT

A vehicle control device includes an actual drag torque calculating unit, which calculates the drag torque of a power transfer mechanism. A lubricating oil flow rate calculating unit determines the flow rate of lubricating oil according to the actual torque, and a reference drag torque calculating unit calculates a reference drag torque. In addition, a reference lubricating oil flow rate calculating unit calculates a reference lubricating oil flow rate according to the reference drag torque. A correction rate calculating unit then calculates a correction value corresponding to the rate of correction of the lubricating oil flow rate according to the lubricating oil flow rate and reference lubricating oil flow rate. A flow rate correction unit outputs a drive signal to an actuator which controls a lubrication oil flow rate according to the correction rate.

17 Claims, 15 Drawing Sheets

FOR EACH OIL TEMPERATURE
FOR EACH ROTATION SPEED

CONTROL DEVICE AND CONTROL METHOD FOR VEHICLE

CLAIM OF PRIORITY

The present application claims priority from Japanese application serial no. 2006-018359, filed on Jan. 27, 2006, the contents of which are hereby incorporated by references into this application.

BACKGROUND OF THE INVENTION

The present invention relates to a vehicle control device and a vehicle control method.

Conventional types of automatic transmission for vehicles include one which uses a torque converter and one which uses a continuously variable transmission. Recently an automated MT (manual transmission) has been proposed. It is comprised of a system in which clutching and gear change are automated based on a manual transmission mechanism. A recent automated MT system in which a friction clutch (assist clutch) is provided between the input and output shafts of the transmission for keeping torque transfer during gear shift operation, is proposed (for example, see JP-A No. 2000-65199). Furthermore, a so-called twin clutch automated MT is proposed in automated MT systems. In the twin clutch automated MT, each friction type clutch is provided between an engine and each of plural input shafts; by switching the plural friction clutches (namely by clutch to clutch), a shifting is carried out from a gear position established by one input shaft to a gear position established by the other input shaft.

These automatic transmissions often use a power transfer mechanism which transfers and releases power in state of being lubricated with oil (lubricating oil or working fluid; hereinafter representatively called lubricating oil).

The lubricating oil not only has the primary function of lubrication but also functions as a medium for cooling generated heat, offering the advantage that it protects the power transfer mechanism from burnout.

On the other hand, when the power transfer mechanism is released, the lubricating oil works as a source of drag torque, thereby bringing the disadvantage that may cause deterioration in fuel efficiency and shift performance.

SUMMARY OF THE INVENTION

An object of the present invention is to solve the above disadvantage concerning the lubricating oil in order to improve shift performance, safety a vehicle's fuel efficiency.

The present invention is characterized in that: in automatic transmission system, under a prescribed condition, a lubricating oil flow rate is calculated according to the drag torque of a power transfer mechanism; comparison is made between the lubricating oil flow rate and a predetermined reference lubricating oil flow rate; and the lubricating oil flow rate is corrected according to the comparison result.

According to the present invention, in an automatic transmission using a power transfer mechanism which transfers and releases power while being lubricated with oil, shift performance and safety thereof are improved, and eventually a vehicle's fuel efficiency is improved.

DETAILED DESCRIPTION OF THE INVENTION

Figure 1:
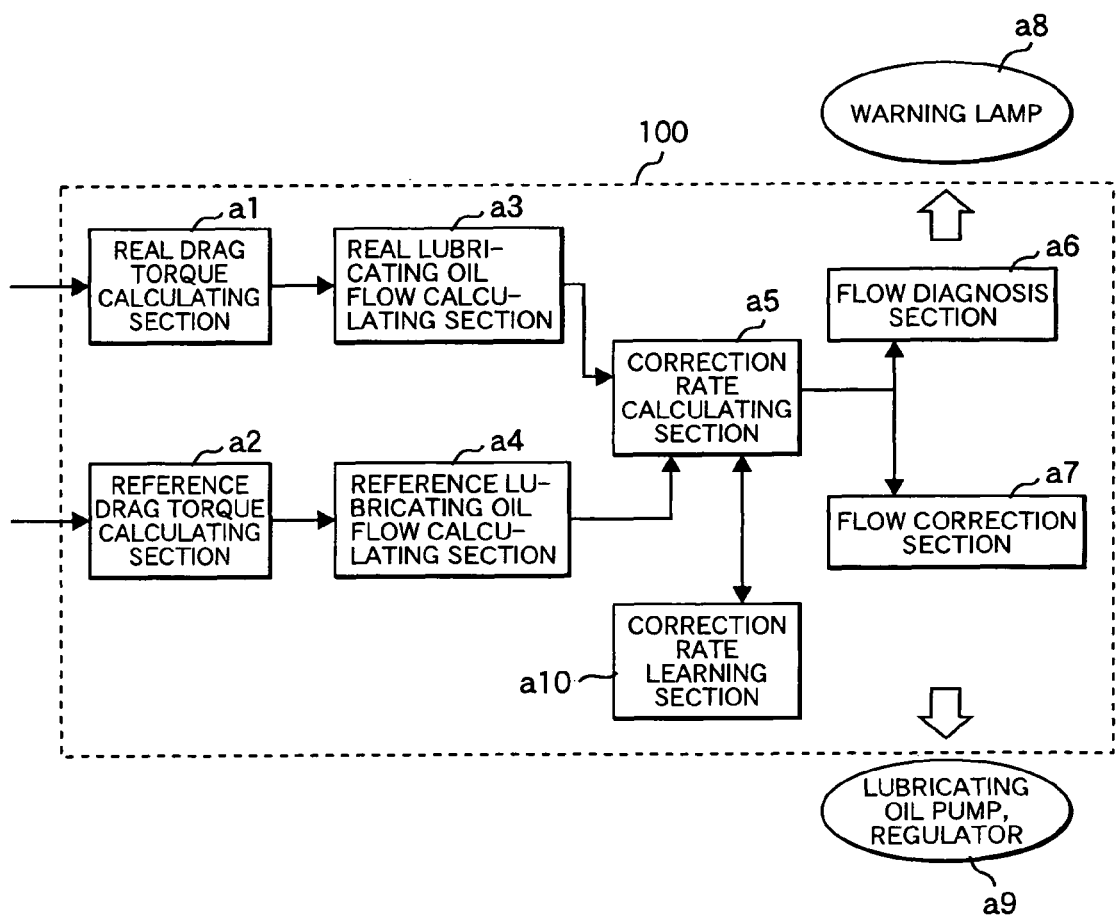
FIG. 1 is a block diagram of a control device as an embodiment of the present invention.

An embodiment of the present invention shown here is an automated MT using a wet type clutch as a typical example of a power transfer mechanism which transfers and releases power while being lubricated with oil. However, application of the present invention is not limited to a wet type clutch but it can be applied to any power transfer mechanism that transfers and releases power while being lubricated with lubricating oil or working fluid. The transmission to which it is applied is not limited to an automated MT but it can be applied to other types of transmissions.

A vehicle with a manual transmission is more fuel-efficient than a vehicle with a transmission using a torque converter. Recently, an automated MT which automates clutching and gear change of a manual transmission mechanism has been proposed. However, in shift control by a conventional automated MT, since a first friction clutch for connecting and disconnecting torque transfer between the engine and the transmission is engaged after having been disengaged once, acceleration fluctuation may occur, thereby giving the vehicle occupants a sense of discomfort.

Therefore, there is a proposed automatic transmission which uses a conventional automated MT provided with a second friction clutch (assist clutch) between the input shaft and output shaft of the transmission. The assist clutch is used for keeping torque transfer during gear shift operation. That is, in shift control by such an automated MT with an assist clutch, at the start of shift, the assist clutch is pressed before a mesh type clutch as the first clutch is disengaged, the resulting assist clutch transfers torque while sliding. And then, when a prescribed torque transfer of the assist clutch is attained, the mesh type clutch is disengaged. Thus, at the start of shift, switching from the mesh type clutch to the assist clutch is carried out in order to achieve torque transfer during gear shift operation.

Another possible proposal is an automatic transmission with a so-called twin clutch automated MT, which has plural input shafts and their friction clutches with respect to a driving shaft of an engine. According to this twin clutch automated MT, by switching the plural friction clutches, a shifting is carried out from a gear position established on one input shaft with a mesh type clutch to a gear position established by the other input shaft with a mesh type clutch (clutch to clutch).

In this twin clutch automated MT, for example, an odd-numbered gear positions and even-numbered gear positions are assigned to corresponding shafts, respectively. In this structure, when a vehicle is driving at a given gear position, the friction clutch and mesh type clutch for the shaft relevant to the given gear position are engaged respectively to perform torque transfer. For a shaft irrelevant to the currently given gear position, since its friction clutch is disengaged, its mesh type clutch can carry out the engagement operation unrestrictedly (namely subsequent selection for gear position can be done freely) while the other shaft is transferring a torque. Therefore, a gear position to be subsequently presumed can be selected and prepared freely before the start of a gear shift operation. Consequently, during a gear shift, while the subsequent mesh type clutch is held engaged, the friction clutch so far engaged is disengaged at a desired timing and the other friction clutch so far disengaged is engaged to switch the transfer torque. Thus, a gear shift operation (gear change) is carried out while torque transfer is continued.

A wet clutch is used for one type of friction clutch in such an automated MT system with friction clutches to prevent torque interruption during the gear shift operation. The wet clutch is always used while being lubricated with oil (hereinafter called lubricating oil). The lubricating oil stays between surfaces of clutch friction members during torque transfer (the engagement of clutch members), so that torque is transferred by the shear force of lubricating oil.

Lubricating oil is not only a torque transfer medium for wet clutch as described above but also plays an important role as a cooling medium for heat generated in synchronization of clutch input and output shafts with different rotation speeds by clutch engagement. For efficient collection of the heat generated here, generally lubricating oil is forced to be fed to the wet clutch by an external lubricating oil pump. Thus, since lubricating oil always stays inside the clutch, the output shaft of the wet clutch necessarily generates a drag torque even upon disengagement of the clutch.

The present invention is produced by focusing on the fact that the drag torque has a correlation with the lubricating oil flow rate and lubricating oil temperature.

Supply of lubricating oil is indispensable to cool a heat-generating clutch. But the flow rate of lubricating oil supplied to the wet clutch is sensitive to drag torque. However, conventionally, even when the lubricating oil flow rate is higher than necessary, an exact flow rate of lubricating oil has not been considered in viewpoint for preventing the drag torque because of emphasis on prevention of clutch burnout or burning. That is, since the conventional flow rate of the lubricating oil has been only dependent on hardware, there is concern that the flow rate of lubricating oil actually supplied to the wet clutch is not strictly managed or controlled in viewpoint for preventing the drag torque.

An extreme increase in lubricating oil flow rate would cause a larger drag torque, resulting in deterioration in fuel efficiency. In addition, since the drag torque would become a load to the synchronizing mechanism of the mesh type clutch for the output shaft of the wet clutch, abrasion due to synchronization or a rotation speed synchronization failure might result. Contrariwise, if the lubricating oil flow rate is insufficient, the fuel efficiency, etc. would not be affected because the drag torque decreases, but collection of heat generated by the clutch would fail, immediately resulting in a clutch burnout or burning.

If the drag torque seriously deviates from a theoretical drag torque due to an excessive or insufficient lubricating oil flow rate, the shift performance as specified on the premise of a given level of drag torque might deteriorate. Therefore, the lubricating oil flow rate must be so controlled to be kept at an adequate level as to ensure both prevention of clutch burnout and reduction of deterioration in fuel efficiency and shift performance.

In consideration of the above, a control device and a control method for an automatic transmission of the present invention are characterized by having the following functions: determining whether the flow rate of lubricating oil to be supplied to the wet clutch is excess or insufficiency, which becomes a cause of clutch burnout, fuel efficiency reduction, and shift performance deterioration; and correcting the flow rate of lubricating oil so as to ensure the lubricating oil-adequate flow rate level, which is a flow rate level capable of preventing clutch burnout and of reducing deterioration in fuel efficiency and shift performance.

Such a control device includes the following means for example:

a real drag torque calculating section for calculating real drag torque of a wet clutch in a vehicle;

a reference drag torque calculating section for calculating a reference drag torque to be preferable in accordance with a wet clutch condition such as at least one of lubricating oil temperature and rotation speed of the clutch;

a real lubricating oil flow rate calculating section for calculating a real flow rate of lubricating oil supplied to the wet clutch, in accordance with the real drag torque;

a reference lubricating oil flow rate calculating section for calculating a reference flow rate of lubricating oil to be supplied to the wet clutch in order to attain the reference drag torque;

a correction flow rate calculating section for calculating a correction flow rate of lubricating oil in accordance with comparison between the real lubricating oil flow rate and the reference lubricating oil flow rate;

a flow rate correction section for driving an actuator such as a lubricating oil pump and a regulator according to the correction flow rate;

a flow rate diagnosis section for diagnosing a failure or abnormality of a lubricating oil supply device from the correction flow rate;

and a warning lamp for warning a driver of the abnormality when diagnosing that.

Also the control devise may include a correction value learning section for storing the calculated correction flow rate to enable continuous correction.

In the above configuration, the real flow rate and the reference flow rate of lubricating oil although are compared to each other to calculate the correction flow rate, instead of that, it may be also possible to calculate the correction flow rate of the lubricating oil flow rate in accordance with comparison between the real drag torque and the reference drag torque.

In this configuration, the real drag torque (or real lubricating oil flow rate) is compared with a preferable reference drag torque (or reference lubricating oil flow rate) for the wet clutch in a given condition; and the lubricating oil flow rate is corrected so that the real drag torque is equal to the reference drag torque. If the real drag torque is low, namely the real lubricating oil flow rate is insufficient, the lubricating oil flow rate is increased so as to be equal to the reference drag torque, so that clutch burnout caused by inadequate clutch cooling is avoided. If the real drag torque is higher than the reference (namely the real lubricating oil flow rate is excessive), the lubricating oil flow rate is decreased so as to be equal to the reference drag torque, so that the drag torque is lowered, and deterioration in fuel efficiency and shift performance is reduced. Thus, by correcting or controlling the lubricating oil flow rate so as to reach to the reference drag torque, it is possible to achieve both clutch cooling performance and improvement in fuel efficiency and shift performance. Furthermore, by learning and storing the corrected flow rate in various driving ranges and conditions, drag torque deviation from the reference is kept within a prescribed range to realize stable shift performance.

First Embodiment

This embodiment illustrates an example of control for a wet clutch comprising a twin clutch mechanism being used for a twin clutch type automated MT.

FIG. 1 is a block diagram of a control device as an embodiment of the present invention.

A power train control unit 100 as a control device includes: a real drag torque calculating section a1 which calculates the drag torque of a wet clutch in an actual vehicle; a reference drag torque calculating section a2 which calculates a preferable drag torque according to a wet clutch condition such as lubricating oil temperature, and rotation speed; a real lubricating oil flow rate calculating section a3 which calculates, from the real drag torque, a real flow rate of lubricating oil actually supplied to the wet clutch; a reference lubricating oil flow rate calculating section a4 which calculates a preferable reference flow rate of lubricating oil to be supplied to the wet clutch in order to attain the reference drag torque; a correction rate calculating section a5 which calculates a correction flow rate of lubricating oil flow (or a value equivalent to the correction flow rate) in accordance with comparison between the real lubricating oil flow rate and the reference lubricating oil flow rate; a flow rate correction section a7 which drives an actuator a9 such as a lubricating oil pump and regulator in accordance with the correction rate; a flow rate diagnosis section a6 which diagnoses a failure or abnormality of a lubricating oil supply device from the correction flow rate; and a warning lamp a8 which warns a driver of an abnormality when diagnosing that. According to the above configuration, the lubricating oil flow rate can be corrected to make the calculated real drag torque equal to the reference drag torque.

Here, the real lubricating oil flow rate calculated by the calculating section a3 is not limited to one based on the real drag torque; instead of that, a flow rate sensor parameter or pressure sensor parameter may be used directly. Also by providing the correction value learning section a10, it is possible to enable continuous correction. Although this embodiment uses comparison between the real flow rate and the reference flow rate of lubricating oil to calculate the correction flow rate, it may be also possible to calculate the correction floe rate of the lubricating oil flow rate in accordance with comparison between the real drag torque and the reference drag torque at the drag torque stage before calculation of the lubricating oil flow rate.

In this embodiment, the calculating section a5 compares the real value (the real drag torque or the real lubricating oil flow rate) to the reference value (the reference drag torque or the reference lubricating oil flow rate) preferable for the wet clutch in a given condition; and the lubricating oil flow rate is corrected so that the real value is equal to the reference value. If the real value is lower than the reference value, namely the lubricating oil flow rate is insufficient, the correction section a7 increases the real value (real lubricating oil flow rate or real drag torque) so as to make the real value it equal to the reference value. Thereby, clutch burnout is avoided. If the real value is higher than the reference, the correction section a7 decreases the real value (real lubricating oil flow rate or real drag torque) so as to make the real value it equal to the reference. Thereby the drag torque is lowered; fuel efficiency and shift performance are improved.

In this way, the drag torque is so controlled as to be constantly within a prescribed range from the reference by ensuring that the real drag torque does not deviate from the reference drag torque, or if it deviates, by correcting or controlling the lubricating oil flow rate; and thus it is possible to achieve both clutch cooling performance and improvement in fuel efficiency and shift performance.

This embodiment although constantly compares the real value (the real drag torque or the real lubricating oil flow rate) to the reference, it may make an exception to the following case. That is, in a so-called clutch transitional state where the clutch is generating heat and the lubricating oil flow rate should be compulsorily increased to cool the clutch just after or during engagement of the wet clutch, the above correction to be the reference drag torque, namely correction of the lubricating oil flow rate by the correction value may be not carried out.

Also, for example, a decision whether the clutch is in the above clutch transitional state is done in accordance with the lubricating oil temperature, and the correction to make the real value reach to the reference value may be carried out only when the temperature is out of the range corresponding to the transitional state.

Figure 2:
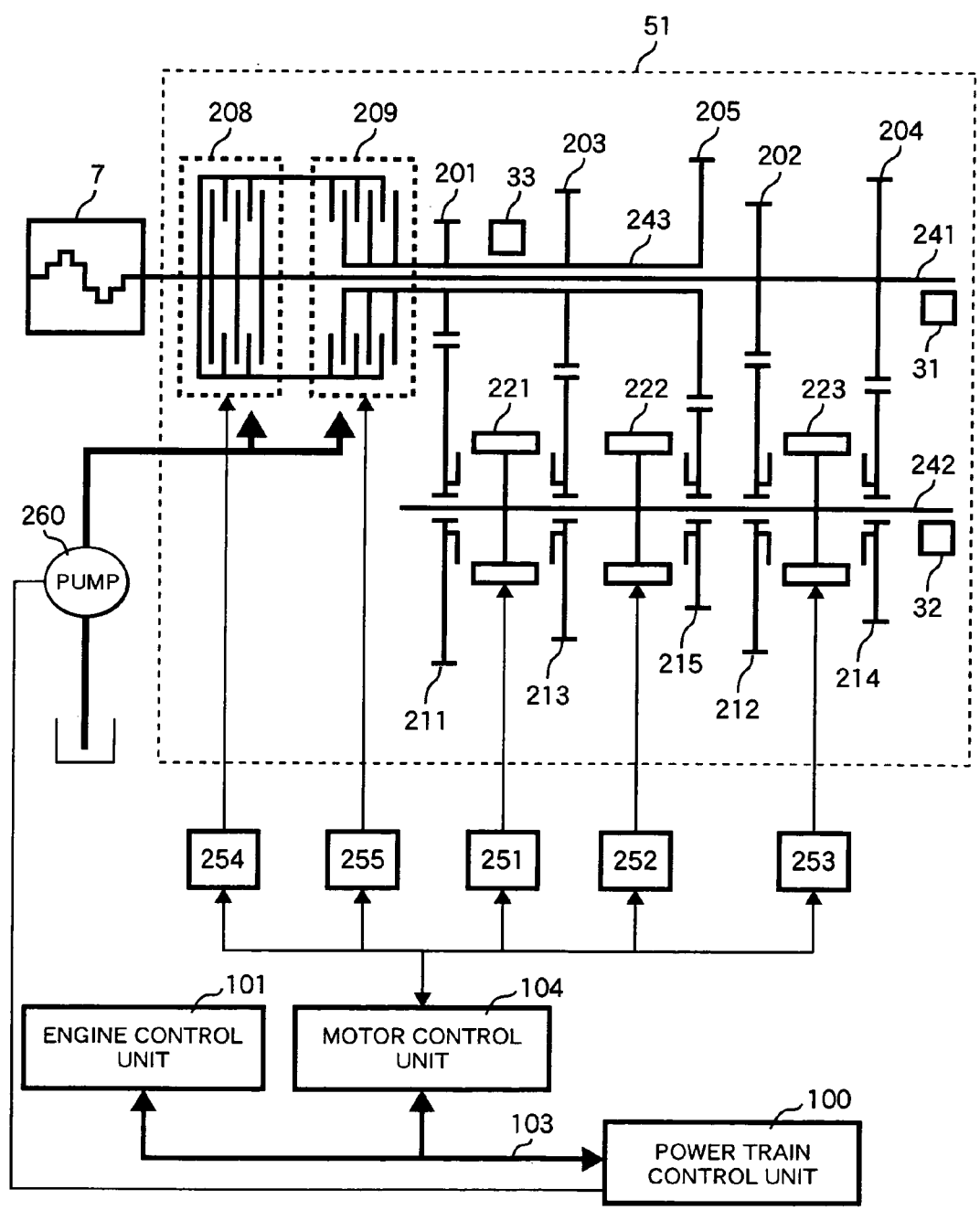
FIG. 2 is a skeleton diagram of an automatic transmission system including a power train control unit 100 as shown in FIG. 1.

FIG. 2 is a skeleton diagram of an automatic transmission system including the power train control unit 100 as shown in FIG. 1.

The system includes an engine 7 as a driving power source, an engine speed sensor (not shown) for measuring the speed (number of rotations per unit time) of the engine 7, an electronically controlled throttle (not shown) for controlling the engine torque, and a fuel injection device (not shown) for injection of a suitable amount of fuel for the intake air flow rate. The system is designed to control the torque of the engine 7 accurately by controlling the intake air flow rate, fuel quantity and ignition timing and the like. As a fuel injection device, an intake port injection type which injects fuel toward an intake port or a cylinder injection type which directly injects fuel into a cylinder is available; and it is advantageous to adopt an engine type which reduces fuel consumption and demonstrates good exhaust performance, as a result of comparison in the driving range required of an engine (range determined by engine torque and engine speed). As a driving power source, not only a gasoline engine but also a diesel engine, natural gas engine or a motor may be used.

An automatic transmission 51 includes a first clutch 208, a second clutch 209, a first input shaft 241, a second input shaft 243, an output shaft 242, a first drive gear 201, a second drive gear 202, a third drive gear 203, a fourth drive gear 204, a fifth drive gear 205, a first driven gear 211, a second driven gear 212, a third driven gear 213, a fourth driven gear 214, a fifth driven gear 215, a first mesh type mechanism 221, a second mesh type mechanism 222, a third mesh type mechanism 223, a rotation sensor 31, a rotation sensor 32 and a rotation sensor 33.

This embodiment illustrates a transmission with a twin clutch. More specifically, upon engagement of the first clutch 208, the torque of the engine 7 is transferred to the first input shaft 241; and upon engagement of the second clutch 209, the torque of the engine 7 is transferred to the second input shaft 243. The second input shaft 243 is hollow; and the first input shaft 241 is put through the hollow of the second input shaft 243 so as to be capable of independently rotating without respect to the second input shaft 243.

The first drive gear 201, third drive gear 203 and fifth drive gear 205 are fixed on the second input shaft 243 and can rotate without respect to the first input shaft 241. The second drive gear 202 and fourth drive gear 204 are fixed on the first input shaft 241 and can rotate without respect to the second input shaft 243.

The first clutch 208 is engaged and disengaged by a first clutch actuator 254. The second clutch 209 is engaged and disengaged by a second clutch actuator 255.

The sensor 31 is provided as a means for measuring the rotation speed of the first input shaft 241. The sensor 33 is provided as a means for measuring the rotation speed of the second input shaft 243.

On the other hand, the first driven gear 211, second driven gear 212, third driven gear 213, fourth driven gear 214 and fifth driven gear 215 are provided for the output shaft 242. The first driven gear 211, second driven gear 212, third driven gear 213, fourth driven gear 214 and fifth driven gear 215 can rotate without respect to the output shaft 242.

The sensor 32 is provided as a means for measuring the rotation speed of the output shaft 242.

The first mesh type mechanism 221, which can selectively engage the first driven gear 211 or the third driven gear 213 with the output shaft 242, is provided between the first driven gear 211 and third driven gear 213.

The third mesh type mechanism 223, which can selectively engage the second driven gear 212 or the fourth driven gear 214 with the output shaft 242, is provided between the second driven gear 212 and fourth driven gear 214.

The second mesh type mechanism 222, which can engage the fifth driven gear 215 with the output shaft 242, is provided for the fifth driven gear 215.

Here, it is desirable for the above mesh type mechanisms 221, 222 and 223 to have a friction transfer mechanism and to use a synchronous mesh system in which meshing is done by pressing the friction surface to synchronize the rotation speed.

A shift actuator 251 shifts the first mesh type mechanism 221 and engages it with the first driven gear 211 or third driven gear 213 so that the rotating torque of the second input shaft 243 is transferred to the output shaft 242 through the first mesh type mechanism 221.

A shift actuator 253 shifts the third mesh type mechanism 223 and engages it with the second driven gear 212 or fourth driven gear 214 so that the rotating torque of the first input shaft 241 is transferred to the output shaft 242 through the third mesh type mechanism 223.

A shift actuator 252 shifts the second mesh type mechanism 222 and engages it with the fifth driven gear 215 so that the rotating torque of the second input shaft 243 is transferred to the output shaft 242 through the second mesh type mechanism 222.

In this way, the rotating torque of the first input shaft 241 or second input shaft 243 is selectively transferred to the axle (not shown) through a differential gear (not shown) connected with the output shaft 242, via either of the first drive gear 201—the first driven gear 211 as 1st gear position, the second drive gear 202—the second driven gear 212 as 2nd gear position, the third drive gear 203—the third driven gear 213 as 3rd gear position, the fourth drive gear 204—the fourth driven gear 214 as 4th gear position, and the fifth drive gear 205—fifth driven gear 215 as 5th gear position.

The first clutch actuator 254 performs engagement/disengagement of the first clutch 208 to control the transfer torque. The second clutch actuator 255 performs engagement/disengagement of the second clutch 209 to control the transfer torque. Each of those actuators comprises a motor (not shown) whose current is controlled by a motor control unit 104 so that the above engagement/disengagement of the clutch is controlled.

The motor control unit 104 also controls the currents of the motors (not shown) provided in the shift actuators 251, 252, and 253 to control the load or stroke position (shift position) which actuates any of the first mesh type mechanism 221, second mesh type mechanism 222, and third mesh type mechanism 223.

The motor control unit 104 and an engine control unit 101 are controlled by a power train control unit 100. The power train control unit 100, engine control unit 101, and motor control unit 104 receive information from and transmit information to each other through communication section 103.

In this embodiment, the first clutch actuator 254, second clutch actuator 255 and shift actuators 251, 252, 253 are motor type actuators; however, they may be hydraulic actuators which include a hydraulic source, a hydraulic cylinder and electromagnetic valves. Similarly the motor control unit 104 may be replaced by a hydraulic control unit.

When the first clutch 208 and second clutch 209 are wet clutches, lubricating oil is supplied to the first clutch 208 and second clutch 209 from an electric lubricating oil pump 260 driven by the power train control unit 100. Although a electric pump type lubricating oil supply system is shown here, it does not limit the supply and flow rate control system; and an engine-driven pump or flow rate regulator or any system that can supply lubricating oil to wet clutches may be used instead.

The lubricating oil generates a drag torque in the wet clutches and the present invention is intended to control the drag torque within a prescribed range by correcting the lubricating oil flow rate.

Also, FIG. 2 although shows that the power train control unit 100, engine control unit 101 and motor control unit 104 are separate units, alternatively one control unit may include the function of another control unit or one control unit may have the functions of all control units. This could prevent a control delay, etc. attributable to time of signal transmission between control units.

Figure 3:
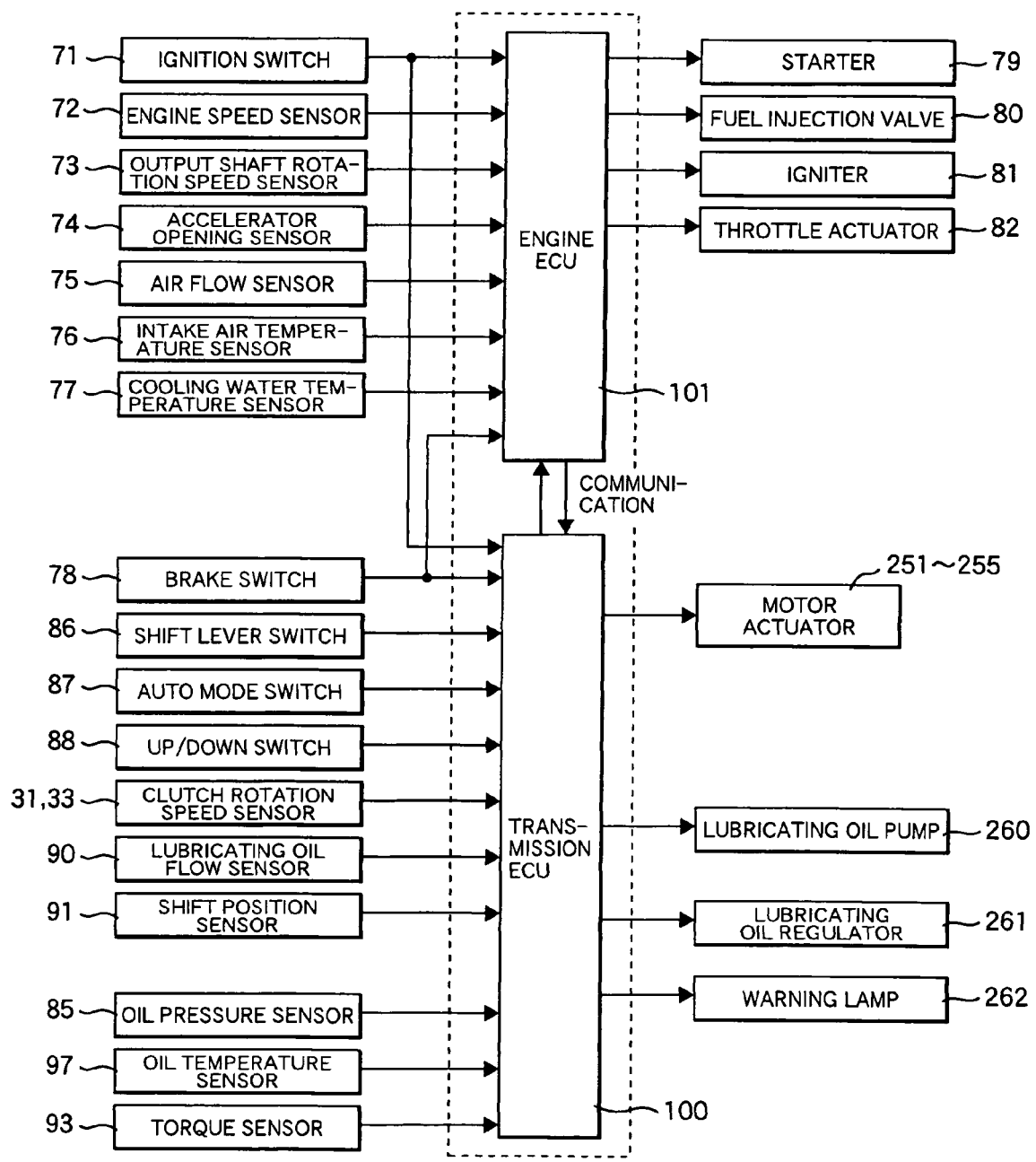
FIG. 3 is a block diagram illustrating an electric control system in the control units as shown in FIG. 2.

FIG. 3 is a block diagram illustrating an electric control system in the control units as shown in FIG. 2.

In this embodiment, the automatic transmission control device includes two ECUs: an engine control unit (ECU: Electronic Control Unit) 101 and a power train control unit (ECU) 100, where necessary information is communicated between the ECUs through a communication line. The ECUs 100 and 101, both of which include a microcomputer, process signals according to a program previously stored in a ROM using the temporary storage function of a RAM. Instead a rewritable ROM may be used for a storage function where rewriting is done as necessary.

The engine ECU is connected with an ignition switch 71, an engine speed sensor 72, an output shaft rotation speed sensor 73, an accelerator opening sensor 74, an air flow sensor 75, an intake air temperature sensor 76, a cooling water temperature sensor 77, a brake switch 78 and so on. Their signals respectively indicates an operational position of the ignition switch 71, an engine speed Ne, an output shaft rotation speed No, an accelerator opening APS, an intake air flow rate Q, an intake air temperature Ta, an engine cooling water temperature Tw, an operational position of the brake switch 78 and so on; and in accordance with these signals, a starter 79 is rotated to start the engine 7, the volume or time of fuel injection by a fuel injection valve 80 is controlled, the time of ignition by an ignition plug is controlled by an igniter 81 and a throttle actuator 82 is driven to control the throttle opening degree by receiving a required signal from the power train control unit 100.

The transmission ECU is connected with the ignition switch 71, a shift lever switch 86, an auto mode switch 87, an up/down switch 88, a brake switch 78, clutch rotation speed sensors 31, 33, a shift position sensor 91, a lubricating oil flow rate sensor 90, a hydraulic sensor 85, an oil temperature sensor 97, and a torque sensor 93. The lubricating oil flow rate sensor 90 is corresponding to the real lubricating oil flow rate calculating section a3 as shown in FIG. 1, and which measures the flow rate of lubricating oil supplied to a wet clutch for obtaining the real lubricating oil flow rate directly. The hydraulic sensor 85 is used for measuring the supplied lubricating oil pressure. The oil temperature sensor 97 is used for measuring the temperature of lubricating oil. The torque sensor 93 is corresponding to the real drag torque calculating section a1 as shown in FIG. 1 for obtaining the drag torque directly.

Then, by taking in these signals and required signals from the engine control ECU, the wet clutches and motor actuators 251-255 as shift actuators are controlled to achieve shift control.

In this embodiment, outputs to a lubricating oil pump 260 and a lubricating oil regulator 261 are provided in order to correct or control the lubricating oil flow rate so as to reach the reference drag torque. Such control is performed by the flow rate correction section a7 as shown in FIG. 1. Furthermore, a warning lamp 262 is provided to warn the driver of the result of the flow rate diagnosis section a6.

Figure 4:
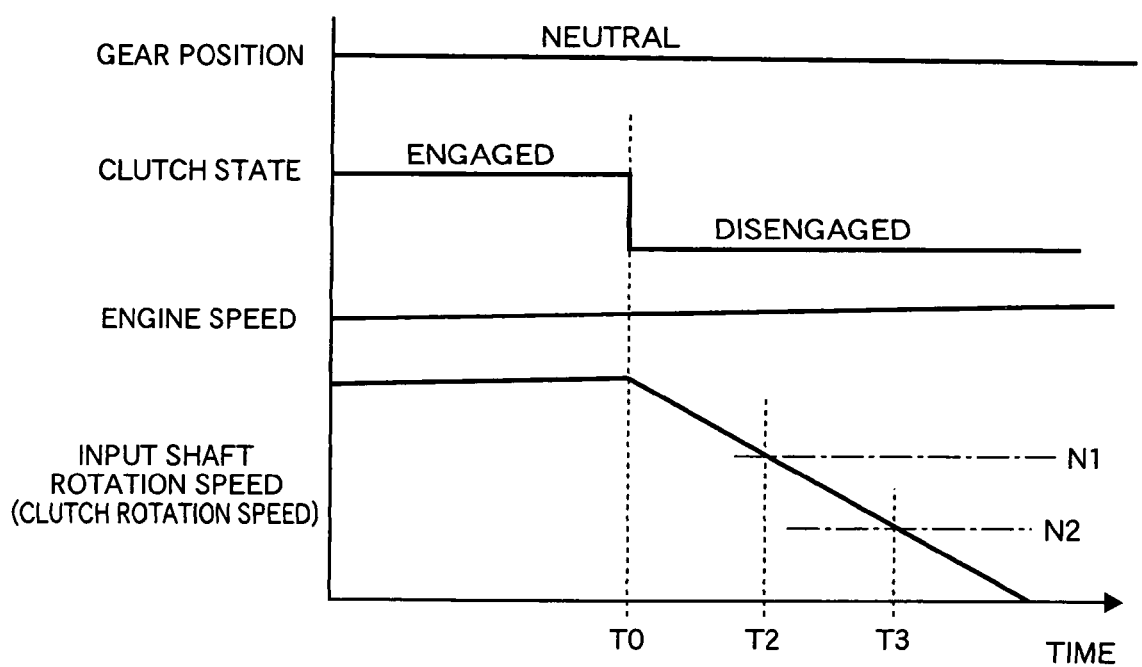
FIG. 4 shows an example of a drag torque calculation method in the real drag torque calculating means a1 as shown in FIG. 1.

FIG. 4 shows an example of a drag torque calculation method in the real drag torque calculating section a1.

With the gear in a neutral position, the clutch is engaged in the period up to time T0 and thus the input shaft rotation speed namely clutch rotation speed is equal to the engine speed. For instance, when the first clutch 208 in FIG. 2 is engaged, the clutch rotation speed sensed by the rotation speed sensor 31 is equal to the rotation speed of the engine 7. At time T0, the clutch is disengaged and the input shaft rotation speed begins to drop. This rotation speed drop is caused by wet clutch drag and the drag torque can be calculated with reference to rotation speed drop per given time from Equation 1.×

$$\text{Drag torque } Td = (N1-N2)/(T3-T2) \times \ln \times K \quad \text{Equation 1}$$

where ln: clutch shaft inertia coefficient
K: unit conversion factor

If the drag torque is not directly sensed by a torque sensor 93, this method permits drag torque calculation without addition of a sensor which would lead to cost rise. However, it is desirable that the above equation be used when the clutch is disengaged and the gear position is neutral, namely in a no-load condition, for the shaft relevant to drag torque calculation.

Figure 5:
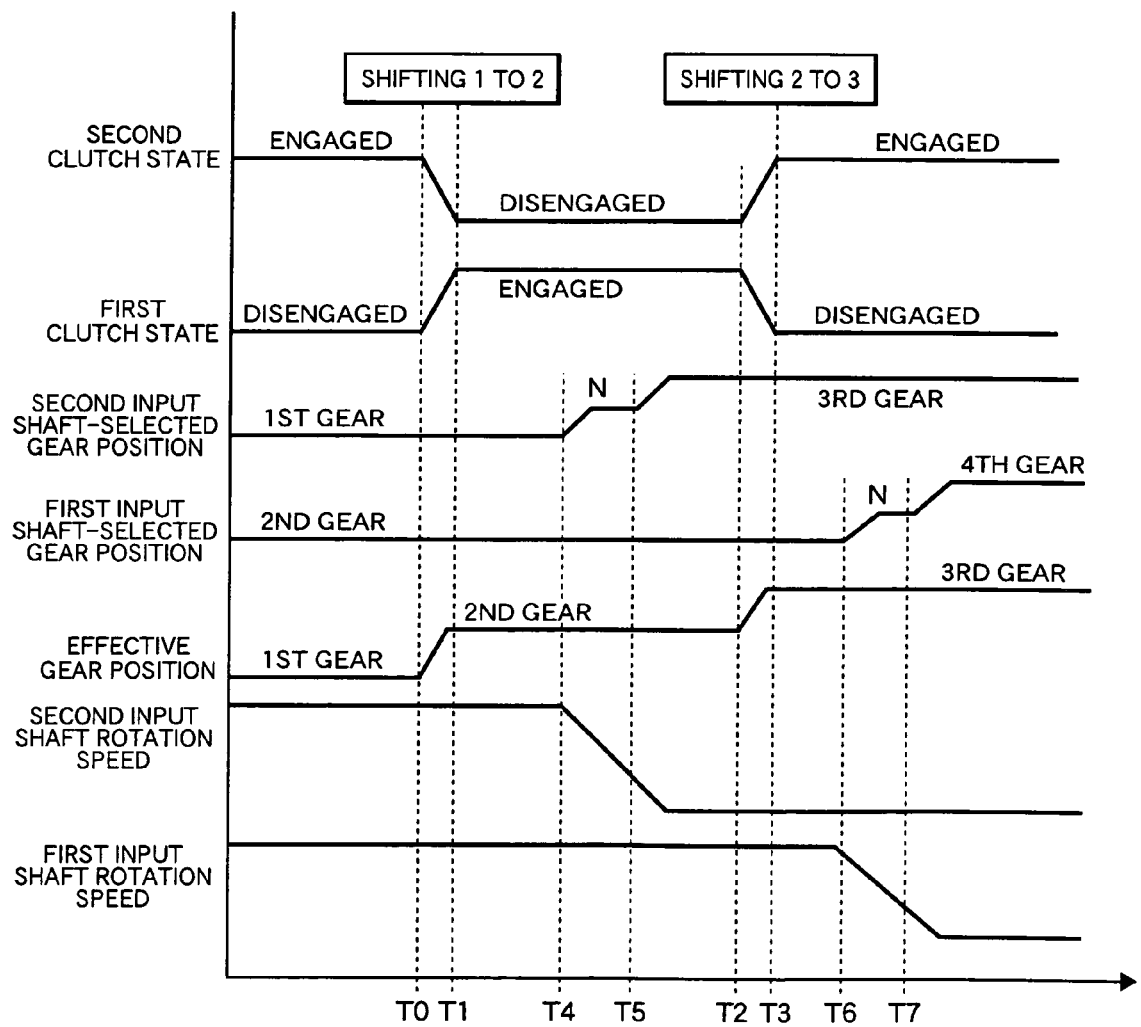
FIG. 5 shows an example of timing for drag torque calculation as shown in FIG. 1.

FIG. 5 shows an example of timing for drag torque calculation as shown in FIG. 1.

When the 1st gear (201,211) is selected on the second input shaft 243 and the 2nd gear (202,212) is selected on the first input shaft 241, the second clutch 209 remains engaged until time T0 and rotating torque from the engine 7 is transferred to the output shaft 242 through the second input shaft 243 and the 1st gear (201,211). At time T0, the torque is switched from the second clutch 209 to the first clutch 208 (clutch to clutch: disengagement and engagement of the clutches) upon request for up-shift from first to second gearshift, and the gearshift operation completes at time T1 and the rotating torque from the engine 7 is transferred to the output shaft 242 through the first input shaft 241 and the 2nd gear (202,212). At this moment, the second input shaft 243 is a shaft which transfers no torque and either of gears on the shaft 243 is preset as a next gearshift position by selected gear position (pre-shift). For example, at time T4, when gear position to be selected as pre-shift on the second input shaft 243 is the 3rd gear position (203,213), pre-shift from the 1st to the 3d gear position begins upon pre-shift request. In accordance with such pre-shift request, the first mesh type mechanism 221 is operated so that the first driven gear 211 having been engaged with the output shaft 242 until now is disengaged and the third driven gear 213 is engaged instead. Meanwhile, the gear position temporarily becomes neutral, so that the real drag torque can be calculated in accordance with variation in rotation speed of the clutch input shaft on above-mentioned no-load condition (time period from T4 to T5).

Likewise, in the first input shaft 241, it is possible to calculate the real drag torque. That is, at time T3, up-shift from the 2nd to 3rd gear position is completed and the rotating torque from the engine 7 is transferred to the output shaft 242 through the second input shaft 243 and the 3rd gear position (203,213). On the other hand, the first input shaft 241 becomes a shaft which transfers no torque and, at time T6, prepares for a next shift by pre-shift motion. For example, at time T6, when gear position to be selected as pre-shift on the first input shaft 241 is the 4th gear position (204,214), pre-shift from the 2nd to the 4th gear position begins upon pre-shift request. In this time period from T6 to T7, the gear position temporarily becomes neutral, so that the real drag torque can be calculated.

Figure 6:
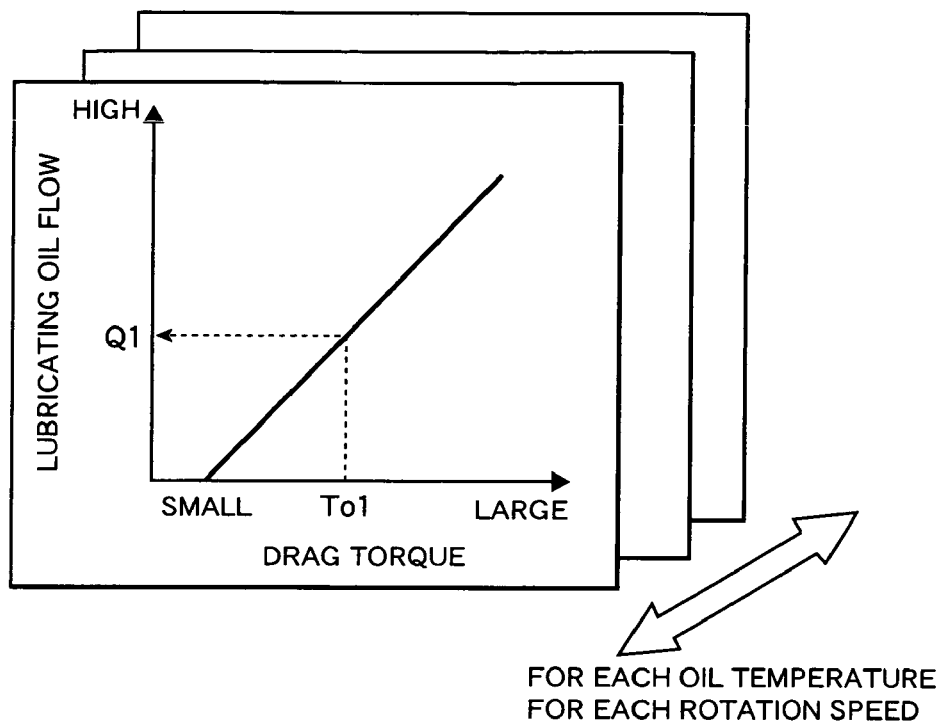
FIG. 6 shows an example of correlation between drag torque and lubricating oil flow rate as used in the actual lubricating oil flow rate calculating means a3 and reference lubricating oil flow rate calculating means a4.

FIG. 6 shows an example of the correlation between drag torque and lubricating oil flow rate as used in the real lubricating oil flow rate calculating section a3 and reference lubricating oil flow rate calculating section a4 as shown in FIG. 1.

This correlation and characteristic are previously stored as a map and a table. They are used to calculate the lubricating oil flow rate from the drag torque. There is a tendency that as the lubricating oil flow rate increases, the drag torque increases. In accordance with this characteristic, lubricating oil flow rate Q1 at drag torque To1 can be calculated. Also, since this characteristic has sensitivity to lubricating oil temperature and clutch rotation speed, it is possible, for example, to store plural tables and maps classified by lubricating oil temperature and by rotation speed previously as characteristic data. When making correction of the lubricating oil flow rate according to this embodiment, switching or selection among the above tables and maps is done according to the temperature/rotation speed at that time so as to ensure accuracy in calculating the lubricating oil flow rate in relation to the drag torque.

The use of maps/tables for characteristic data storage and setting as described in this embodiment is not limiting but a calculation formula that produces the same result as the result of calculation by the maps/tables may be used.

Figure 12:
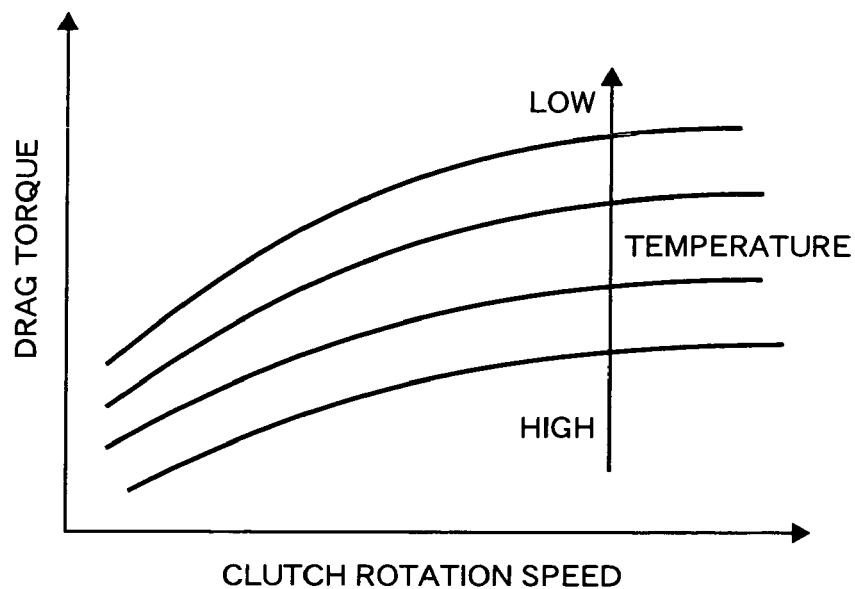
FIG. 12 shows an example of the reference drag torque calculating means a2 as shown in FIG. 1.

FIG. 12 shows an example of the reference drag torque calculating section a2 as shown in FIG. 1.

As mentioned above, the drag torque has sensitivity to lubricating oil flow rate, rotation speed, and lubricating oil temperature. In order to correct the lubricating oil flow rate according to the present invention, in this example, the parameter concerned is fixed and a reference drag torque is calculated from maps, depending on clutch rotation speed and lubricating oil temperature. There is tendency that as the clutch rotation speed is higher or the lubricating oil temperature is lower, the drag torque is larger. Since "lubricating oil flow rate" is used for correction, it is also possible that its sensitivity is replaced by a parameter which steadily increases or decreases the lubricating oil flow rate and plural maps are provided for each of such parameters. For example, such parameters include driving load, engine speed, transmission actuator-control pressure (line pressure) and supply voltage.

Figure 7:
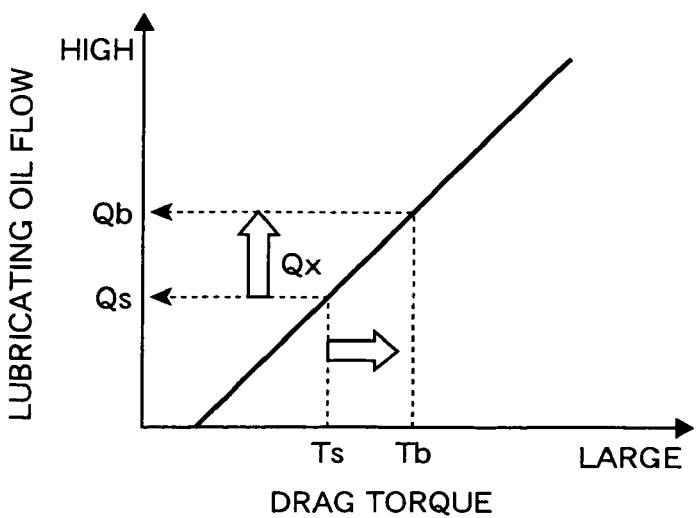
FIG. 7 shows an example of the correction rate calculating means a5 as shown in FIG. 1.

FIG. 7 shows an example of the correction rate calculating section a5 as shown in FIG. 1.

When Qb represents reference lubricating oil flow rate for reference drag torque Tb and Qs represents real lubricating oil flow rate for real drag torque Ts, it is possible to approximate the real drag torque Ts to the reference drag torque Tb by increasing the flow rate by the equivalent of lubricating oil flow rate difference Qx between Qb and Qs. The correction rate Qx is calculated from lubricating oil flow rate in this example; however, instead, drag torque difference Tb-Ts may be used to calculate the required lubricating oil flow rate correction rate corresponding to the difference.

This example concerns a condition that the real drag torque is smaller than the reference, which includes a case that the desired lubricating oil flow rate is not actually supplied to the wet clutches.

Figure 8:
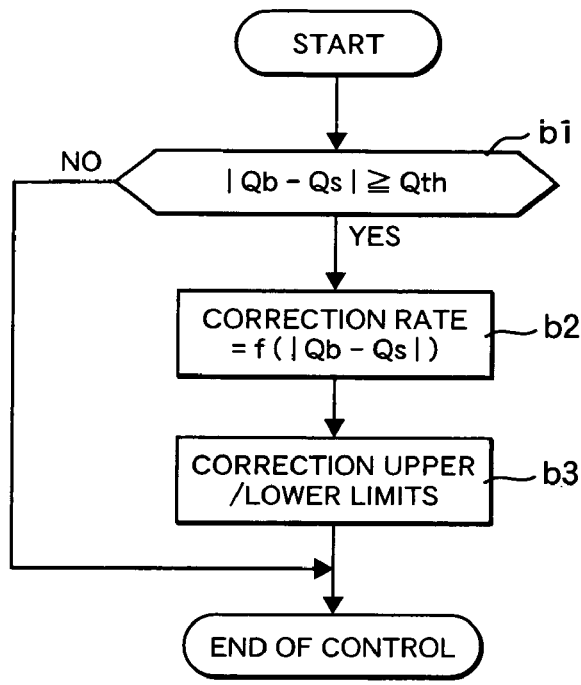
FIG. 8 shows an example of the calculation flow chart for the correction rate calculating means a5 as shown in FIG. 1.

FIG. 8 shows an example of the calculation flow chart for the correction rate calculating section a5 as shown in FIG. 1.

A decision is made at step b1 as to whether or not the difference between reference lubricating oil flow rate Qb and real lubricating oil flow rate Qs is more than or equal to a threshold Qth for the permission of correction. Here the real value Qs is calculated by the real lubricating oil flow rate calculating section a3 and the reference Qb is calculated by the reference lubricating oil flow rate calculating section a4. This step is done to limit the allowable range of correction range so as not to correct permissible sensing error of sensor, permissible calculation error or the like. Next, at step b2 the correction rate is calculated using the above difference as a parameter. This step is carried out by table/map search or a calculation formula based on difference data. The correction rate calculated here may be an absolute quantity or ratio of lubricating oil flow rate.

Figure 9:
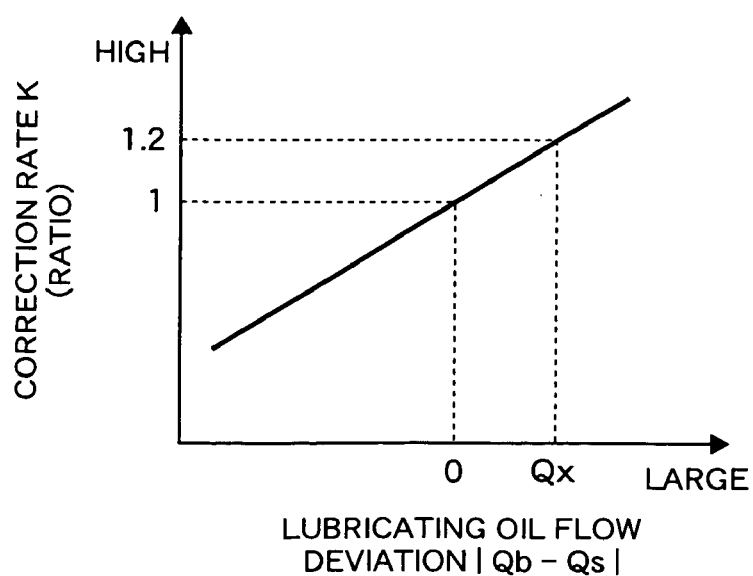
FIG. 9 shows an example of correction rate determination as shown in FIG. 8.

FIG. 9 shows an example of correction rate determination as shown in FIG. 8.

This example concerns a case that correction rate K is calculated in reference to lubricating oil flow rate difference or deviation. When the deviation is 0, correction rate K is 1 and virtually no correction is made; when the deviation is Qx, correction rate K is 1.2 and the lubricating oil flow rate is increased by a factor of 1.2. Lastly, it is desirable that at step b3, the correction rate be limited by an upper limit and a lower limit to prohibit unusual correction.

Figure 10:
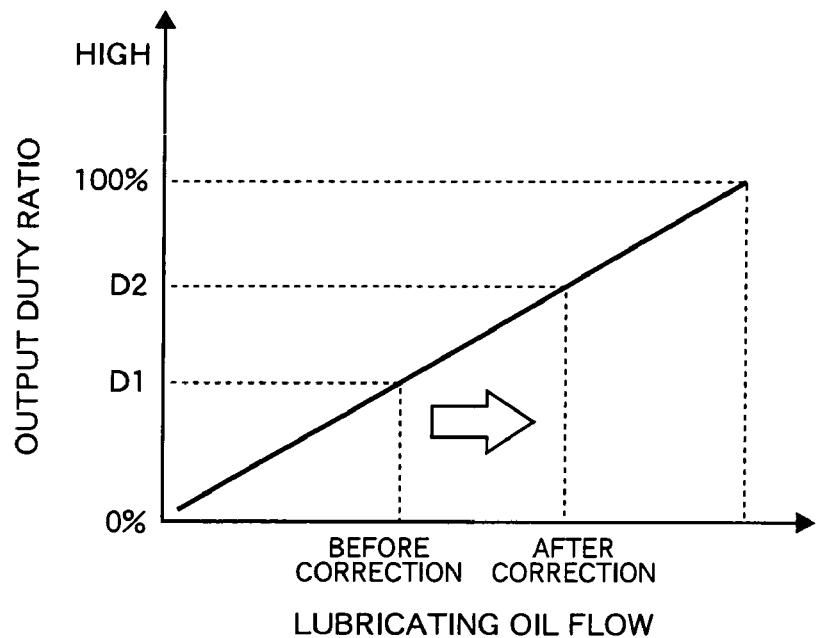
FIG. 10 shows an example of the method of correction by the flow rate correction means a7 as shown in FIG. 1.

FIG. 10 shows an example of the method of correction by the flow rate correction section a7 as shown in FIG. 1.

The section a7 calculates an output to an actuator for realizing correction of the lubricating oil flow rate. The output is corresponding to a correction rate calculated by the correction rate calculating section a5. This example shows a case that the actuator is an electrically driven variable displacement pump and the output duty ratio to the pump, which is PWM-controlled, is calculated.

Instead, the actuator may be a pump driven directly by engine power, and a system which can correct the lubricating oil flow rate by controlling a relief rate for the pump may be configured. In this system, output to a regulator for the pump is calculated to control the relief rate in accordance with the correction rate calculated in the above mentioned same way.

Figure 11:
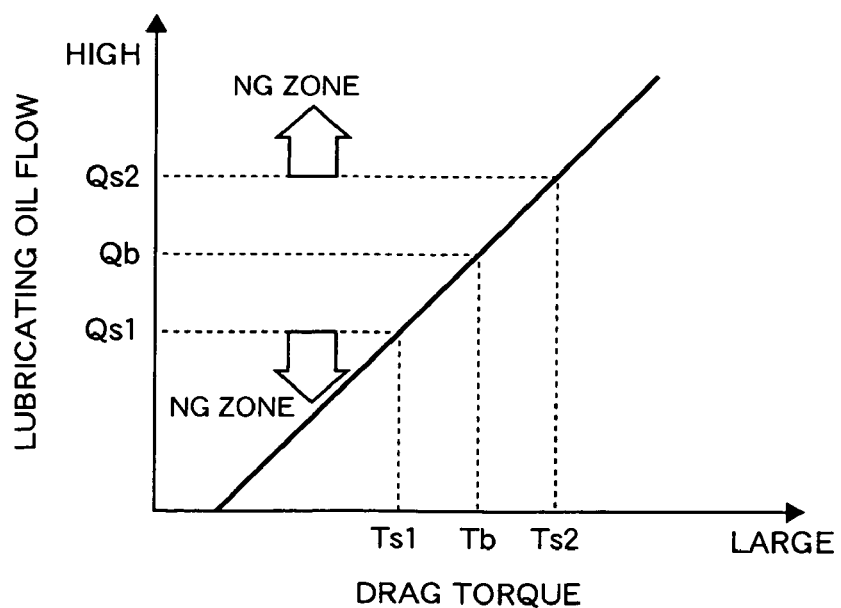
FIG. 11 shows an example of the range for fault diagnosis by the flow rate diagnosis means a6 as shown in FIG. 1.

FIG. 11 shows an example of the range of fault diagnosis by the flow rate diagnosis section a6 as shown in FIG. 1.

In this example, when the real lubricating oil flow rate corresponding to the real drag torque becomes equal to or more than upper limit Qs2 or becomes equal to or less than lower limit Qs1, the real lubricating supply device is decided to be abnormal or defective. The upper limit and lower limit is set relative to the reference lubricating oil flow rate Qb corresponding to reference drag torque Tb. The upper and lower limits are determined in consideration of estimation error, sensing error and calculation error for the lubricating oil flow rate.

Figure 16:
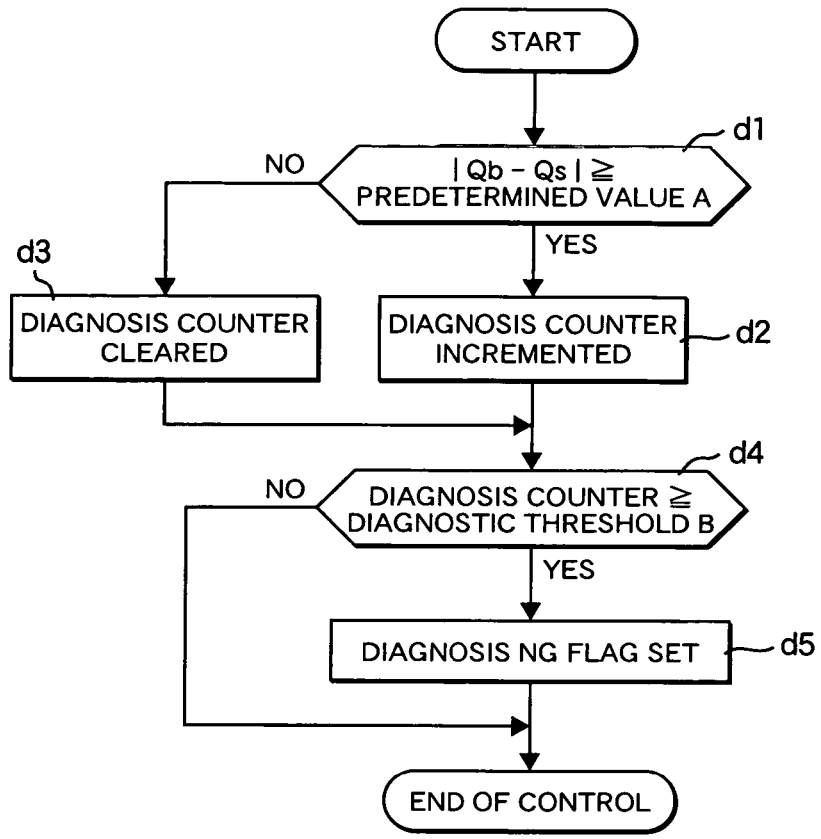
FIG. 16 shows a flow chart for the example as shown in FIG. 11.

FIG. 16 shows a flow chart for the example as shown in FIG. 11.

This is an example that an NG decision is made when the real lubricating oil flow rate is apparently different from the reference lubricating oil flow rate. At step d1, a decision whether the difference between the reference and the real lubricating oil flow rate is more than or equal to a predetermined value A is done. Qs1 and Qs2 for NG zone decision in FIG. 11 correspond to the value A. If it is more than or equal to the value A, the diagnosis counter is incremented at step d2. If it is less than the prescribed value A, the diagnosis counter is cleared at step d3. At step d4, whether the diagnosis counter is more than or equal to a diagnosis threshold B is decided and if the counter has been incremented as many times as prescribed, a diagnostic NG flag is set at step d5. According to this NG flag, a warning lamp is turned on to show the driver a warning of occurrence of a fault.

This example although uses one diagnosis counter, for the purpose of assuring diagnosis accuracy, a plurality of diagnosis counters, or a diagnosis counter for each driving range and each driving condition, may be provided so that an NG decision is made if diagnosis counters are similarly incremented in plural ranges and conditions.

Figure 15:
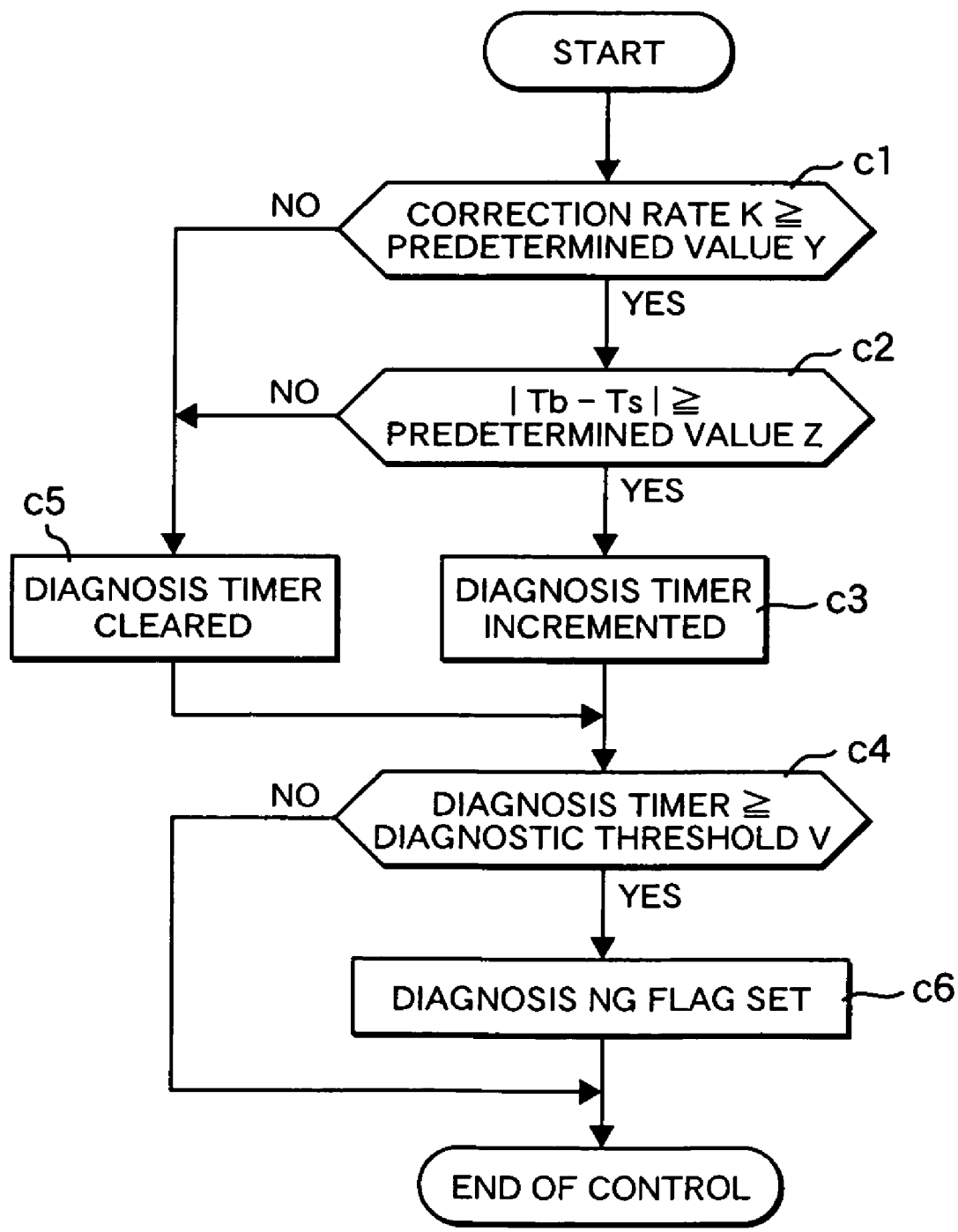
FIG. 15 shows an example of the diagnosis flow chart in which the deviation of the actual flow rate from the reference does not converge and an NG decision is made.

FIG. 15 shows an example of the diagnosis flow chart in which, in spite of a flow rate correction made, the deviation of the real flow rate for the reference does not converge and an NG decision is made.

Figure 17:
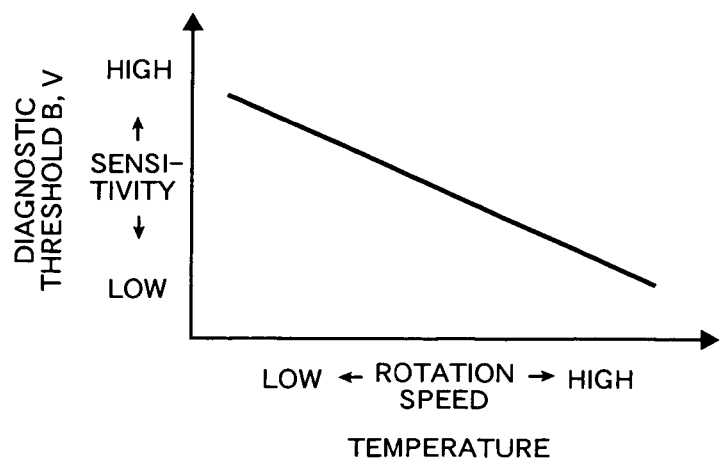
FIG. 17 shows an example of setting diagnostic thresholds B and V in FIG. 15 and FIG. 16.

First, at step c1, a decision whether the correction rate K calculated by the correction rate calculating section a5 is more than or equal to a predetermined value Y is done, thereby deciding whether confirm that correction has been carried out to some degree. Next, a decision whether the deviation of the real drag torque from the reference is more than or equal to a predetermined value Z is done at step c2 and if it is found that the deviation does not converge in spite of carrying out the correction, the diagnosis timer is incremented at step c3. If the answer at steps c1 and c2 is "No", the diagnosis timer is cleared. The diagnosis whether the diagnosis timer is more than or equal to a diagnostic threshold V is done at step c4 and if the failure to converge continues longer than a predetermined time, a diagnostic NG flag is set. Again, for the purpose of assuring diagnosis accuracy, a diagnosis timer may be provided for each of plural ranges and conditions in the same manner as mentioned above. It is desirable that the diagnostic thresholds B and V as shown in FIGS. 15 and 16 vary with such parameters as lubricating oil temperature and rotation speed as shown in FIG. 17.

Although temperature and rotation speed are used here, these parameters are not limiting and any parameter correlative to diagnostic sensitivity may be used.

Figure 13:
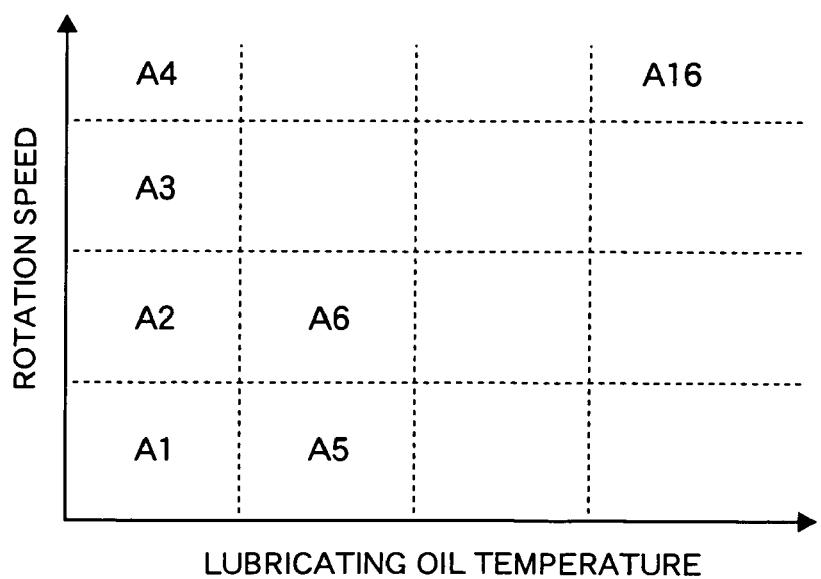
FIG. 13 shows an example of the learning map for the correction learning means a10 as shown in FIG. 1.

FIG. 13 shows an example of the learning map for the correction learning section a10 as shown in FIG. 1.

A correction rate of the lubricating oil flow rate, which is for keeping the real drag torque in a predetermined range from the reference drag torque, is stored for each zone as defined by lubricating oil temperature and rotation speed correlative to drag torque. In this example, the learning zone for correction rate is classified into 16 zones in accordance with rotation speed and temperature; however, this form of map, including learning zones, is not limiting.

Figure 14:
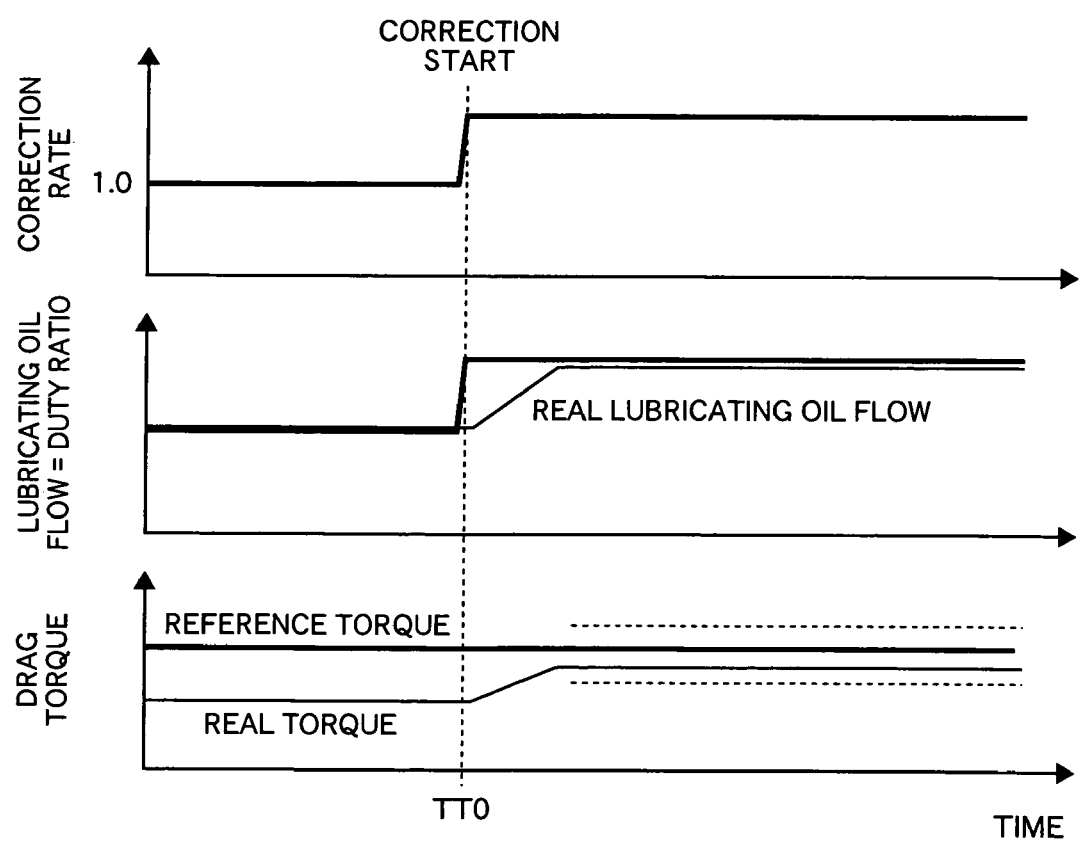
FIG. 14 shows an example of the time chart after start of correction as shown in FIG. 1.

FIG. 14 shows an example of the time chart after start of correction as shown in FIG. 1.

After time TT0 when lubricating oil flow rate correction starts, the real flow rate of lubricating oil supplied to the wet clutch begins to change. Accordingly the real drag torque gradually comes closer to the reference drag torque. The correction rate for making the deviation to be within a predetermined value is updated and stored as a learnt value.

As described above, according to this embodiment, the lubricating oil flow rate is corrected automatically when the real drag torque has deviated or is going to deviate from the reference drag torque so that correction or control is made to keep the drag torque within a predetermined range. In other words, the lubricating oil flow rate for the power transfer mechanism is varied so that the drag torque of the power transfer mechanism does not change in a given condition or driving range.

Figure 19:
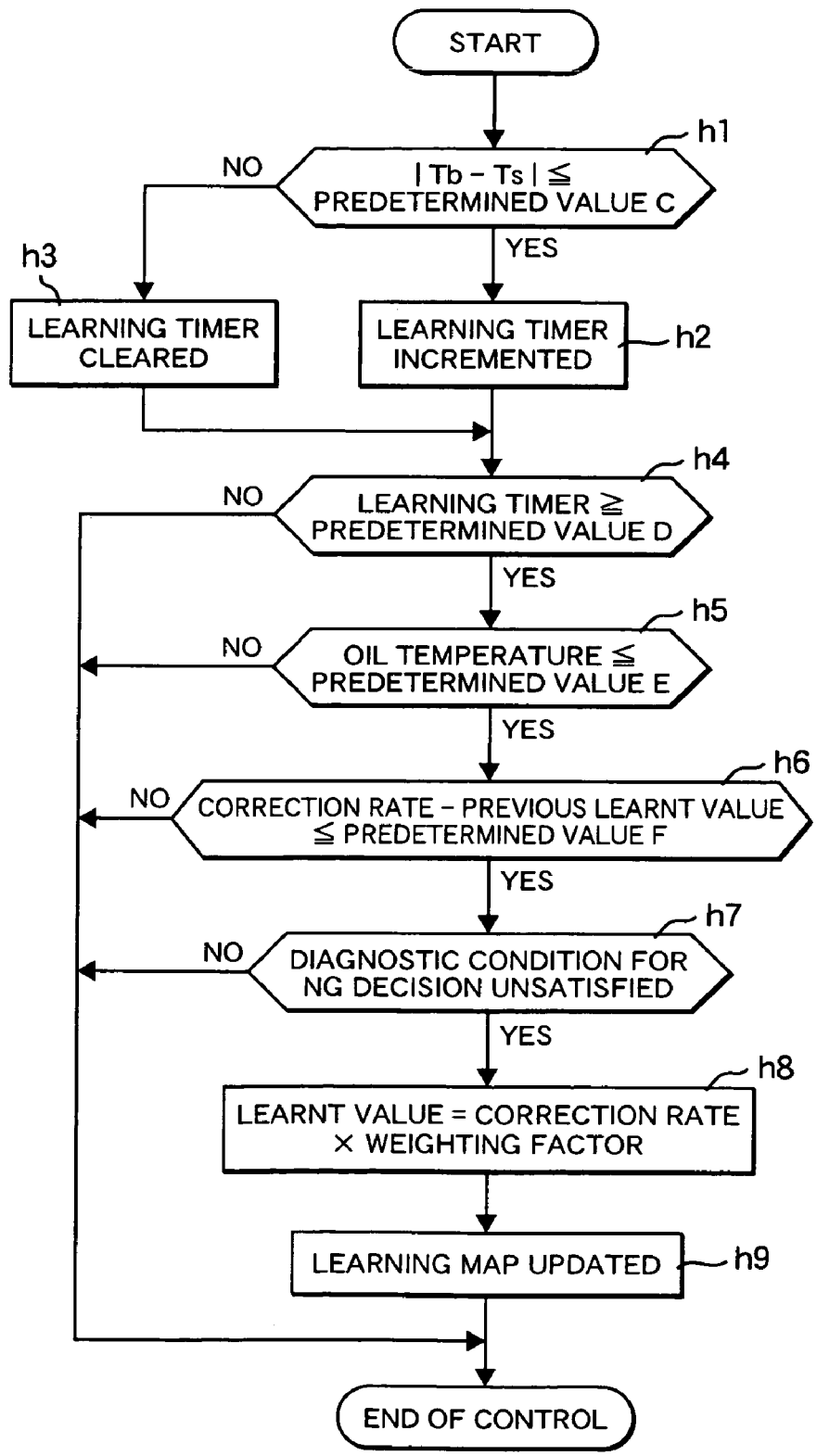
FIG. 19 is an example of the learning flow chart for the example as shown in FIG. 1.

FIG. 19 is an example of the learning flow chart in the example as shown in FIG. 1.

At step h1, a decision whether the deviation of the real drag torque from the reference drag torque is less than or equal to a predetermined value C as an allowable learning deviation is done; if so, a learning timer for decision on learning start is incremented at step h2. Then, when the following conditions are met at steps h4-h7, namely when the learning timer is not less than a prescribed value D, the lubricating oil temperature is not more than a predetermined value E, the amount of change from the previous learnt value is not more than a predetermined value F and a diagnostic NG decision is not made, then the correction rate is multiplied by a weighting factor at step 8 and the learnt value for the learning zone concerned is updated at step h9.

Figure 18:
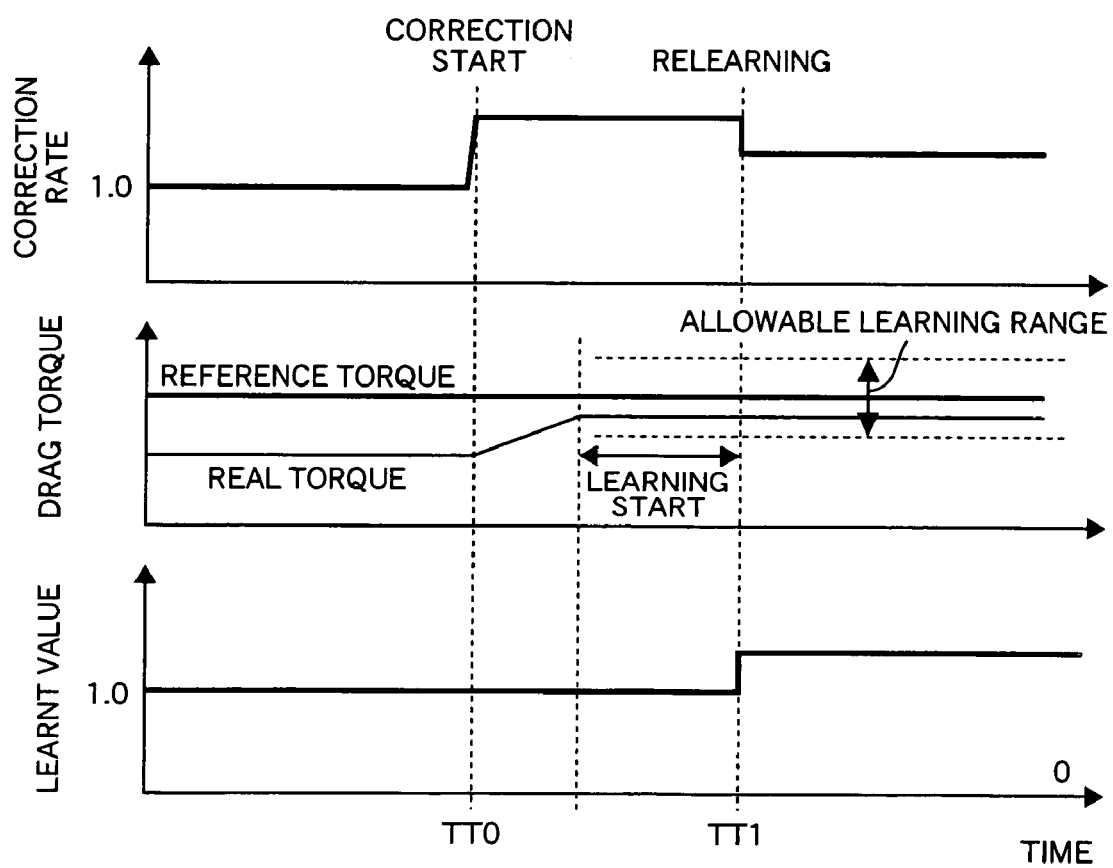
FIG. 18 shows an example of the time chart for learning as shown in FIG. 19.

FIG. 18 shows an example of the learning timing chart as shown in FIG. 19.

When the real drag torque gradually comes closer to the reference drag torque after time TT0 and falls within an allowable learning range, from that point in time, the learning timer is incremented. At time TT1 when a learning start time has elapsed on the learning timer, the correction rate multiplied by a weighting factor is updated as a learnt value, and at the same time, subtraction from the correction rate is done.

Second Embodiment

Figure 20:
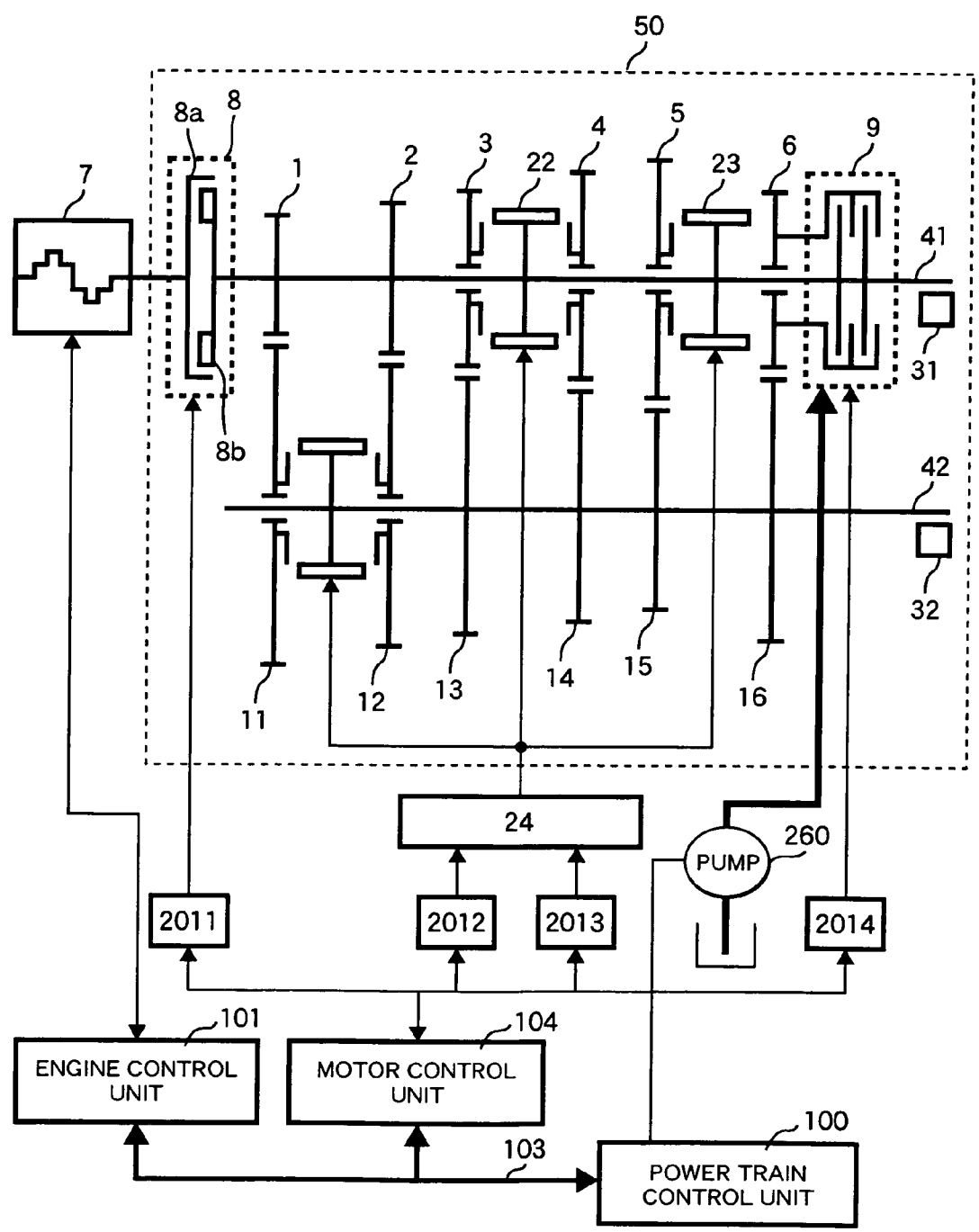
FIG. 20 is a skeleton diagram of an example of a second system configuration including a vehicle control device with an automatic transmission according to another embodiment of the present invention.

FIG. 20 is a skeleton diagram of an example of a second system configuration including a vehicle control device with an automatic transmission according to another embodiment of the present invention.

The same reference numerals as in FIG. 1 represent the same elements. This embodiment concerns a transfer with an assist clutch, a so-called torque assist type automatic transmission.

An automatic transmission 50 includes a clutch 8 for an input shaft, an assist clutch 9, an input shaft 41 for transmission, an output shaft 42, a first drive gear 1, a second drive gear 2, a third drive gear 3, a fourth drive gear 4, a fifth drive gear 5, a sixth drive gear 6, a first driven gear 11, a second driven gear 12, a third driven gear 13, a fourth driven gear 14, a fifth driven gear 15, a sixth driven gear 16, a first mesh type mechanism 21, a second mesh type mechanism 22, a third mesh type mechanism 23, a rotation sensor 31 and a rotation sensor 32.

The engine 7 is connected with an input disc 8a of the input shaft-use clutch 8. Engagement or disengagement between the input disc 8a and an output disc 8b of the input shaft use-clutch 8 enables or disables transfer of the torque of the engine 7 to the transmission-input shaft 41. The input shaft use-clutch 8 is typically a dry single-disc clutch but any type of clutch including a wet multiple-disc clutch or electromagnetic clutch may be used. An actuator 2011 driven by a motor is used to control a press force (torque of input shaft use-clutch) between the input disc 8a and the output disc 8b of the clutch, and by controlling this press force, transfer of output from the engine 7 to the input shaft 41 is enabled or disabled.

The first drive gear 1, the second drive gear 2, the third drive gear 3, the fourth drive gear 4, the fifth drive gear 5 and the sixth drive gear 6 are provided for the input shaft 41. The first drive gear 1 and second drive gear 2 are fixed on the input shaft 41 of the transmission and the third drive gear, the fourth drive gear 4, the fifth drive gear 5 and the sixth drive gear 6 can freely rotate with respect to the input shaft 41. The rotation sensor 31 is provided as a means for measuring the input shaft rotation speed as the rotation speed of the input shaft 41.

On the other hand, the first driven gear 11, the second driven gear 12, the third driven gear 13, the fourth driven gear 14, the fifth driven gear 15 and the sixth driven gear 16 are provided for the output shaft 42. The first driven gear 11 and the second driven gear 12 can freely rotate with respect to the output shaft 242 while the third driven gear 13, the fourth driven gear 14, the fifth driven gear 15 and the sixth driven gear 16 are fixed on the output shaft 42.

The rotation sensor 32 is provided as a means for measuring detecting the rotation speed of the output shaft 42.

The first drive gear 1 meshes with the first driven gear 11; the second drive gear 2 meshes with the second driven gear 12; the third drive gear 3 meshes with the third driven gear 13; the fourth drive gear 4 meshes with the fourth driven gear 14; the fifth drive gear 5 meshes with the fifth driven gear 15; and the sixth drive gear 6 meshes with the sixth driven gear 16.

The input shaft 41 is provided with an assist clutch 9 as one type of friction transfer mechanism; by controlling the transfer torque of the assist clutch 9, the torque of the engine 7 can be transferred to the output shaft 42.

An actuator 2014 driven by a motor is used to control the transfer torque of the assist clutch 9; by controlling the transfer torque (assist clutch torque), output of the engine 7 can be transferred.

The friction transfer mechanism is a mechanism which produces a frictional force by a press force on a friction surface for torque transfer and typical such mechanisms include a dry single-disc clutch, a dry multiple-disc clutch, and a wet multiple-disc clutch. This embodiment uses a wet multiple-disc clutch for the assist clutch.

The first mesh type mechanism 21 is provided between the first driven gear 11 and the second driven gear 12 to engage the first driven gear 11 with the output shaft 42 or engage the second driven gear 12 with the output shaft 42. Hence, the rotating torque transferred from the first drive gear 1 to the first driven gear 11 or from the second drive gear 2 to the second driven gear 12 is transferred through the first mesh type mechanism 21 to the output shaft 42.

The second mesh type mechanism 22 is provided between the third drive gear 3 and the fourth drive gear 4 to engage the third drive gear 3 with the input shaft 41 of the transmission or engage the fourth drive gear 4 with the input shaft 41. Hence, the rotating torque transferred to the third drive gear 3 or fourth drive gear 4 is transferred through the second mesh type mechanism 22 to the third driven gear 13 or fourth driven gear 14, then to the output shaft 42.

The third mesh type mechanism 23 is provided for the fifth drive gear 5 to engage the fifth drive gear 5 with the input shaft 41. Hence, the rotating torque transferred to the fifth drive gear 5 is transferred through the third mesh type mechanism 23 to the fifth driven gear 15, then to the output shaft 42.

Here the mesh type mechanisms 21, 22, 23 may be of the constant meshing type or the synchronous meshing type which has a friction transfer mechanism to synchronize the rotation speed by pressing a friction surface for meshing.

Therefore, in order to transfer the rotating torque of the input shaft 41 to the output shaft 42, any one of the first mesh type mechanism 21, the second mesh type mechanism 22 and the third mesh type mechanism 23 must be shifted in the axial direction of the input shaft 41 or the output shaft 42, and thereby must be engaged with any one of the first driven gear 11, the second driven gear 12, the third drive gear 3, the fourth drive gear 4 and the fifth drive gear 5. A select actuator 2013 actuates a shift/select mechanism 24 to select any one of the first mesh type mechanism 21, the second mesh type mechanism 22 and the third mesh type mechanism 23 to be shifted. And a shift actuator 2012 actuates the shift/select mechanism 24 so that one mesh type mechanism selected among the first mesh type mechanism 21, the second mesh type mechanism 22 and the third mesh type mechanism 23 is shifted and engaged with one of the first driven gear 11, the second driven gear 12, the third drive gear 3, the fourth drive gear 4 and the fifth drive gear 5. Thereby, the rotating torque of the input shaft 41 is transferred to the output shaft 42 through one of the first mesh type mechanism 21, the second mesh type mechanism 22 and the third mesh type mechanism 23.

Thus, the rotating torque of the input shaft 41 is transferred to the output shaft 42 via any one of the first drive gear 1, the second drive gear 2, the third drive gear 3, the fourth drive gear 4, the fifth drive gear 5 and the sixth drive gear 6, and any one of the first driven gear 11, the second driven gear 12, the third driven gear 13, the fourth driven gear 14, the fifth driven gear 15 and the sixth driven gear 16. Thereby, the rotating torque of the input shaft 41 is transferred to the axle (not shown) through a differential gear (not shown) connected with the output shaft 42.

The input shaft-clutch actuator 2011 is used for controlling the transfer torque of the input shaft-clutch 8. The assist clutch actuator 2014 is used for controlling the transfer torque of the assist clutch 9. These actuators control the transfer torque of each clutch by using the motor (not shown) in each of the actuators. The motor control unit 104 controls current of the motor. The input shaft-clutch actuator 2011 is comprised of a motor and a mechanical part which converts the motor's rotary motion into linear motion and includes components such as a worm gear, an arm and a ball screw.

The motor control unit 104 controls the current of the motor (not shown) in the select actuator 2013. Thereby, the select position as a stroke position of a select lever (not shown) is shifted. The select lever is used for selecting any one of the first mesh type mechanism 21, the second mesh type mechanism 22 and the third mesh type mechanism 23 to be shifted.

The motor control unit 104 controls the current of the motor (not shown) in the shift actuator 2012 so that the load or stroke position (shift position) which activates any one of the first mesh type mechanism 21, second mesh type mechanism 22 and third mesh type mechanism 23 is controlled.

When controlling the select actuator 2013 and the shift actuator 2012 to mesh the first mesh type mechanism 21 with the first driven gear 11, the 1st gear position can be set.

When similarly controlling the select actuator 2013 and the shift actuator 2012 to mesh the first mesh type mechanism 21 with the second driven gear 12, the 2nd gear position can be set in.

The shift/select mechanism 23, which activates the first mesh type mechanism 21, the second mesh type mechanism 22, and the third mesh type mechanism 23, may comprise a select lever and a shift fork or may be any other mechanism for shifting the mesh type mechanisms 21, 22, 23, including a drum type one.

The reduction ratio for the sixth drive gear and sixth driven gear to be connected with the assist clutch (one type of friction transfer mechanism) may be set to a ratio between the reduction ratio for the 3rd gear position and the reduction ratio for the 4th gear position. Here, the 3rd gear position is established by the third drive gear 3 and third driven gear 13; the 4th gear position is established by the fourth drive gear 4 and fourth driven gear 14. Instead, the reduction ratio for the sixth drive gear and sixth driven gear may be a ratio between the 4th gear position and 5th gear position, or be equivalent to the reduction ratio for the 3rd gear position, 4th gear position, or highest gear position. It is also possible to use a friction transfer mechanism, for example, as equivalent to the 5th gear position, instead of the fifth drive gear 5, fifth driven gear 15 and third mesh type mechanism, which means that a friction transfer mechanism may be installed instead of a mesh type mechanism provided for a given gear position. Furthermore, a plurality of friction transfer mechanisms may be installed for a plurality of gear positions.

In this embodiment, the technique described in connection with the first embodiment may be applied to at least either the input shaft clutch 8 or the assist clutch 9.

As apparent from the above, the invention can be applied to many types of transmissions which have at least one clutch mechanism inevitably having a drag torque as a friction transfer mechanism, in the above transmission structure.

What is claimed is:

1. A control method for a vehicle with an automatic transmission including a power transfer mechanism that uses lubricating oil, said method comprising:
   determining an actual lubricating oil flow rate based on a drag torque of the power transfer mechanism;

taking into account as condition information at least one of transmission-lubricating oil temperature, transmission actuator line pressure, transmission supply voltage, engine speed and engine driving load as condition information that characterizes the power transfer mechanism, determining a reference drag torque as a desired drag in a given condition in accordance with said condition information, and determining a reference lubricating oil flow rate based on the reference drag torque;

determining a correction value corresponding to a correction lubricating oil flow rate based on the actual lubricating oil flow rate and the reference lubricating oil flow rate; and controlling the actual lubricating oil flow rate in accordance with the correction value.

2. A control device for a vehicle with an automatic transmission including a power transfer mechanism using lubricating oil, said device comprising:

an actual drag torque determining section for determining an actual drag torque of the power transfer mechanism;

an actual lubricating oil flow rate determining section for determining an actual flow rate of the lubricating oil based on the actual drag torque;

a reference drag torque determining section which takes in at least one of transmission-clutch rotation speed, transmission-lubricating oil temperature, transmission-actuator line pressure, transmission-supply voltage, engine speed and engine driving load as condition information that characterizes the power transfer mechanism, and determines a reference drag torque as a desired drag in a given condition in accordance with the condition information;

a reference lubricating oil flow rate determining section for determining a reference lubricating oil flow rate based on the reference drag torque;

a correction value determining section for determining a correction value corresponding to a correction the lubricating oil flow rate, based on the lubricating oil flow rate and the reference lubricating oil flow rate, such that the actual drag torque approaches the reference drag torque; and a flow rate correcting section for outputting a signal for operating to an actuator, which controls the lubricating oil flow rate, in accordance with the correction value.

3. The vehicle control device according to claim 2, wherein the actual drag torque determining section determines the actual drag torque based on an output of a flow rate sensor for the lubricating oil or a pressure sensor for the lubricating oil or a drag torque sensor.

4. The vehicle control device according to claim 2, further comprising a correction value learning section for learning the correction value obtained by the correction value determining section.

5. The vehicle control device according to claim 2, wherein, when the actual lubricating oil flow rate is lower than the reference lubricating oil flow rate, the correction value is determined by differences between the two so as to increase the lubricating oil flow rate.

6. The vehicle control device according to claim 2, wherein, when the actual lubricating oil flow rate is higher than the reference lubricating oil flow rate, the correction value is determined by differences between the two so as to decrease the lubricating oil flow rate.

7. The vehicle control device according to claim 2, wherein, when the power transfer mechanism is in a transitional state, correction of the lubricating oil flow rate according to the correction value is stopped.

8. The vehicle control device according to claim 2, wherein the power transfer mechanism is a wet clutch constituting a twin clutch used for a twin clutch type automatic transmission.

9. The vehicle control device according to claim 2, further comprising a lubricating oil flow rate diagnosing section for making a diagnosis of the lubricating oil flow rate by using the correction value and giving a warning to a driver in accordance with a result of the diagnosis.

10. The vehicle control device according to claim 2, wherein the power transfer mechanism is provided between an engine and an input shaft of the automatic transmission; and wherein the actual drag torque determining section determines the actual drag torque based on change in rotation speed of the input shaft during a neutral state of the automatic transmission after switching the power transfer mechanism from its engaged state to its disengaged state.

11. The vehicle control device according to claim 2, wherein the power transfer mechanism is a mechanism constituting a twin clutch in a twin clutch type automatic transmission; the twin clutch is capable of switching engage/disengage of two input shafts of the automatic transmission to each other for an output shaft; and one of gear positions of the automatic transmission is set in pre-shift state on a disengaged-input shaft of the two input shafts;

wherein the actual drag torque determining section determines the actual drag torque based on change in rotation speed of the input shaft being in pre-shift motion, during a neutral state after switching the power transfer mechanism from its engaged state to its disengaged state.

12. The vehicle control device according to claim 2, further comprising a storage section which stores a characteristic of correlation between the lubricating oil flow rate and the drag torque by a plurality of maps or tables for each lubricating oil temperature and/or rotation speed, wherein the actual lubricating oil determining section and the reference lubricating oil flow rate determining section calculate the actual lubricating oil flow rate and the reference lubricating oil flow rate from the actual drag torque and the reference drag torque by referencing to the maps or tables, respectively.

13. The vehicle control device according to claim 2, wherein the power transfer mechanism is a mechanism which constitutes at least either clutch for an input shaft or an assist clutch in a torque assist type automatic transmission.

14. A control device for a vehicle with an automatic transmission including a power transfer mechanism using lubricating oil, said control device comprising:

an actual drag torque determining section for determining a drag torque of the power transfer mechanism;

a reference drag torque determining section which takes in at least one of transmission-clutch rotation speed, transmission-lubricating oil temperature, transmission-actuator line pressure, transmission-supply voltage, engine speed and engine driving load as condition information that characterizes the power transfer mechanism and determines a reference drag torque as a desired drag in a given condition in accordance with the condition information;

a correction value determining section which compares the drag torque with the reference drag torque and determines a correction value corresponding to a correction lubricating oil flow rate based on a result of the comparison, such that the actual drag torque approaches the reference drag torque; and a flow rate correcting section for outputting a signal for operating to an actuator, which controls the lubricating oil flow rate, in accordance with the correction value.

15. The vehicle control device according to claim 14, wherein, when the actual drag torque is lower than the reference drag torque, the correction value is determined so as to increase the lubricating oil flow rate.

16. The vehicle control device according to claim 14, wherein, when the actual drag torque is higher than the reference drag torque, the correction value is determined so as to decrease the lubricating oil flow rate.

17. A control method for a vehicle with an automatic transmission including a power transfer mechanism using lubricating oil, said method comprising:

determining an actual drag torque of the power transfer mechanism;

taking into account as condition information at least one of transmission-lubricating oil temperature, transmission actuator line pressure, transmission supply voltage, engine speed and engine driving load as condition information that characterizes the power transfer mechanism, determining a reference drag torque as a desired drag in a given condition in accordance with the condition information;

determining a correction value corresponding to a correction lubricating oil flow rate based on the actual drag torque and the reference drag torque, such that the actual drag torque approaches the reference drag torque; and controlling the lubricating oil flow rate in accordance with the correction value.

* * * * *